(12) United States Patent
Masuda

(10) Patent No.: US 11,892,350 B2
(45) Date of Patent: Feb. 6, 2024

(54) DEVICE FOR MEASURING TWO-DIMENSIONAL FLICKER

(71) Applicant: KONICA MINOLTA, INC., Chiyoda-ku (JP)

(72) Inventor: Satoshi Masuda, Neyagawa (JP)

(73) Assignee: KONICA MINOLTA, INC., Tokyo (JP)

(*) Notice: Subject to any disclaimer, the term of this patent is extended or adjusted under 35 U.S.C. 154(b) by 479 days.

(21) Appl. No.: 17/276,791

(22) PCT Filed: Jul. 19, 2019

(86) PCT No.: PCT/JP2019/028447
§ 371 (c)(1),
(2) Date: Mar. 16, 2021

(87) PCT Pub. No.: WO2020/059282
PCT Pub. Date: Mar. 26, 2020

(65) Prior Publication Data
US 2021/0356327 A1     Nov. 18, 2021

(30) Foreign Application Priority Data
Sep. 18, 2018 (JP) ................. 2018-173419

(51) Int. Cl.
*G01J 11/00* (2006.01)
*G01J 1/44* (2006.01)
(52) U.S. Cl.
CPC ............ *G01J 11/00* (2013.01); *G01J 1/44* (2013.01)
(58) Field of Classification Search
CPC ...... G01J 1/44; G01J 11/00; G01J 1/36; G01J 1/42; G01J 2001/4247; G01M 11/00; G02F 1/13; G09F 9/00; G09G 3/006
See application file for complete search history.

(56) References Cited

U.S. PATENT DOCUMENTS

| | | |
|---|---|---|
| 2005/0213822 A1 | 9/2005 | Stober |
| 2015/0122972 A1 | 5/2015 | Fujiki |
| 2016/0282179 A1* | 9/2016 | Nazemi ................. G01J 1/0295 |

FOREIGN PATENT DOCUMENTS

| | | |
|---|---|---|
| CN | 1261687 | 8/2000 |
| CN | 104702853 | 6/2015 |

(Continued)

OTHER PUBLICATIONS

Office Action dated Jan. 10, 2023 issued in Korean Patent Application No. 10-2021-7007668.

(Continued)

*Primary Examiner* — Tri T Ton
(74) *Attorney, Agent, or Firm* — Cozen O'Connor

(57) ABSTRACT

A device for measuring two-dimensional flicker of the present application includes a plurality of two-dimensional sensors having a partial readout function of reading out only a pixel value of some of photoelectric conversion elements included in set partial readout regions, among a plurality of photoelectric conversion elements. In the device for measuring two-dimensional flicker, a plurality of measurement regions are set two-dimensionally on a measurement target object. Each pixel in the plurality of measurement regions is individually acquired, by setting each of the plurality of partial readout regions of the plurality of two-dimensional sensors in each of a plurality of partial imaging regions obtained by dividing an entire imaging region including entirely the measurement target object. A flicker value of the plurality of measurement regions is individually obtained based on each pixel value in the plurality of measurement regions.

19 Claims, 10 Drawing Sheets

(56) References Cited

FOREIGN PATENT DOCUMENTS

| | | |
|---|---|---|
| CN | 105580348 | 5/2016 |
| CN | 105594197 | 5/2016 |
| CN | 106664377 | 5/2017 |
| JP | 9-101236 | 4/1997 |
| JP | 2003-254860 | 9/2003 |
| JP | 2006-270292 | 10/2006 |
| JP | 2007-228019 | 9/2007 |
| JP | 2010-230338 | 10/2010 |
| JP | 2010-233888 | 10/2010 |
| JP | 2011-163947 | 8/2011 |
| JP | 2011-169842 | 9/2011 |
| JP | 2011169842 A * | 9/2011 |
| JP | 2015-91005 | 5/2015 |
| JP | 2018-029232 | 2/2018 |
| WO | WO 2010/109910 | 9/2010 |
| WO | WO 2019/069634 | 4/2019 |

OTHER PUBLICATIONS

Office Action dated Jan. 27, 2023 issued in Japanese Patent Application No. 2020-548041.

International Search Report issued in corresponding PCT Application PCT/JP2019/028447.

Written Opinion issued in corresponding PCT Application PCT/JP2019/028447.

Office Action dated Sep. 21, 2022 issued in Chinese Patent Application No. 201980060299.0.

* cited by examiner

DEVICE FOR MEASURING TWO-DIMENSIONAL FLICKER

RELATED APPLICATIONS

This is a U.S. National Phase Application under 35 USC 371 of International Application PCT/JP2019/028447 filed on Jul. 19, 2019.

This application claims the priority of Japanese application nos. 2018-173419 filed Sep. 18, 2018, the entire content of both of which are hereby incorporated by reference.

TECHNICAL FIELD

The present invention relates to a device for measuring two-dimensional flicker, for two-dimensionally measuring flicker generated on a display screen of a display device.

BACKGROUND ART

Conventionally, a spot-type device for measuring flicker is known as a measuring device for measurement of flicker generated on a display screen of a display device. The spot-type device for measuring flicker measures flicker by detecting a fluctuation in an outputted pixel value in a predetermined measurement region (hereinafter, also referred to as a "measurement spot") of a measurement target object. In order to detect a fluctuation of a pixel value outputted from the display screen, it is necessary to detect the pixel value at a sampling rate sufficiently higher than a pulsation frequency of interest. Measurement accuracy of flicker depends on a sampling rate in detecting a pixel value. As the sampling rate becomes higher, the flicker measurement accuracy is improved.

The spot-type device for measuring flicker can measure only one measurement spot at one measurement. Therefore, in order to measure flicker of the measurement spots at a plurality of points and measure unevenness of the flicker on the display screen, it is necessary to prepare a plurality of spot-type device for measuring flicker s and measure different measurement spots, or to sequentially measure the measurement spots at the plurality of points with one spot-type device for measuring flicker. For this reason, it takes time and effort to prepare the device and it takes time for the measurement.

As a method for solving the problem of such a spot-type device for measuring flicker, there is a technique proposed in Patent Literature 1. Patent Literature 1 describes a method of two-dimensionally acquiring a fluctuation in a pixel value by imaging a measurement target object by using a two-dimensional sensor such as a CCD camera. However, for measurement of flicker by using a two-dimensional sensor, it is necessary to detect a pixel value at a frame rate sufficiently higher than a pulsation frequency of interest. However, it is difficult for a general two-dimensional sensor to operate at the frame rate required for flicker measurement. Therefore, by using a two-dimensional sensor that can operate at high speed, such as that used for high-speed cameras, high-speed imaging required for flicker measurement becomes possible, which can realize flicker measurement.

However, two-dimensional sensors capable of high-speed operation are expensive. Further, a two-dimensional sensor capable of high-speed operation needs to process analog image data before AD conversion at high speed as compared with a general two-dimensional sensor, which increases noise. Therefore, reproducibility of the acquired pixel value fluctuation data is poor, which deteriorates the flicker measurement accuracy.

CITATION LIST

Patent Literature

Patent Literature 1: JP 2003-254860 A

SUMMARY OF INVENTION

The present invention has been made in view of the above circumstances, and an object of the present invention is to provide a device for measuring two-dimensional flicker capable of two-dimensionally measuring flicker of a measurement target object by using a two-dimensional sensor, without deteriorating measurement accuracy.

In order to achieve the object described above, a device for measuring two-dimensional flicker reflecting one aspect of the present invention includes:

a plurality of two-dimensional sensors having a partial readout function of reading out only a pixel value of some of photoelectric conversion elements included in partial readout regions that have been set, among a plurality of photoelectric conversion elements, in which a plurality of measurement regions are set two-dimensionally on the measurement target object, each pixel in the plurality of measurement regions is individually acquired, by setting each of the plurality of partial readout regions of the plurality of two-dimensional sensors, in each of a plurality of partial imaging regions obtained by dividing an entire imaging region including entirely the measurement target object, and based on each pixel value in the plurality of measurement regions, a flicker value of the plurality of measurement regions is individually obtained.

Advantages and features afforded by one or more embodiments of the invention are fully understood from the detailed description given below and the accompanying drawings. The detailed description and accompanying drawings are provided by way of example only, and are not intended as definitions of the limitations of the present invention.

DESCRIPTION OF EMBODIMENTS

Figure 1:
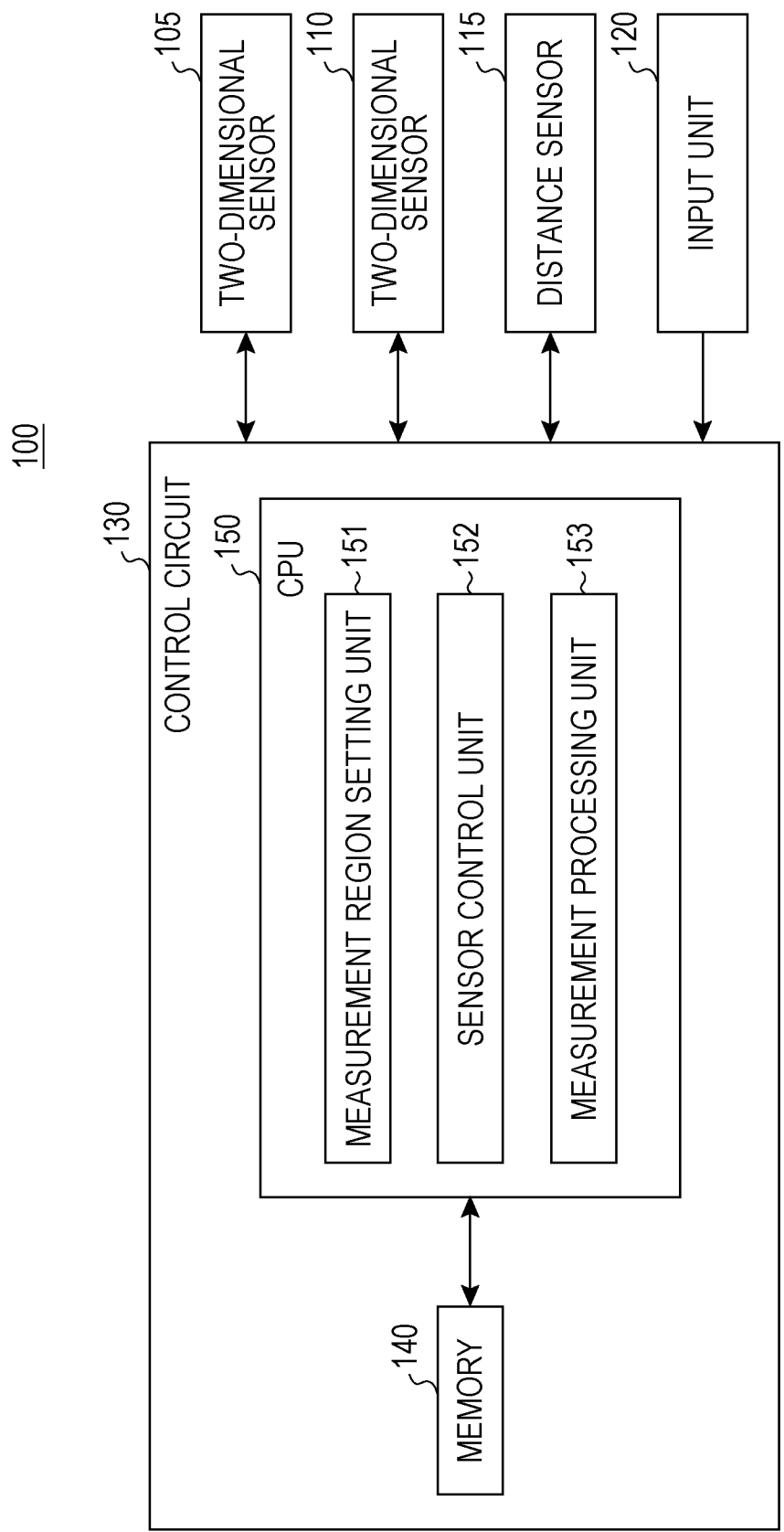
FIG. 1 is a block diagram schematically showing an example of an electrical configuration of a device for measuring two-dimensional flicker of a first embodiment.

Hereinafter, one or more embodiments of the present invention will be described with reference to the drawings. However, the scope of the invention is not limited to the disclosed embodiments. Note that, in each figure, the same reference numerals are used for the same components, and detailed description thereof will be omitted as appropriate.

First Embodiment

Figure 2:
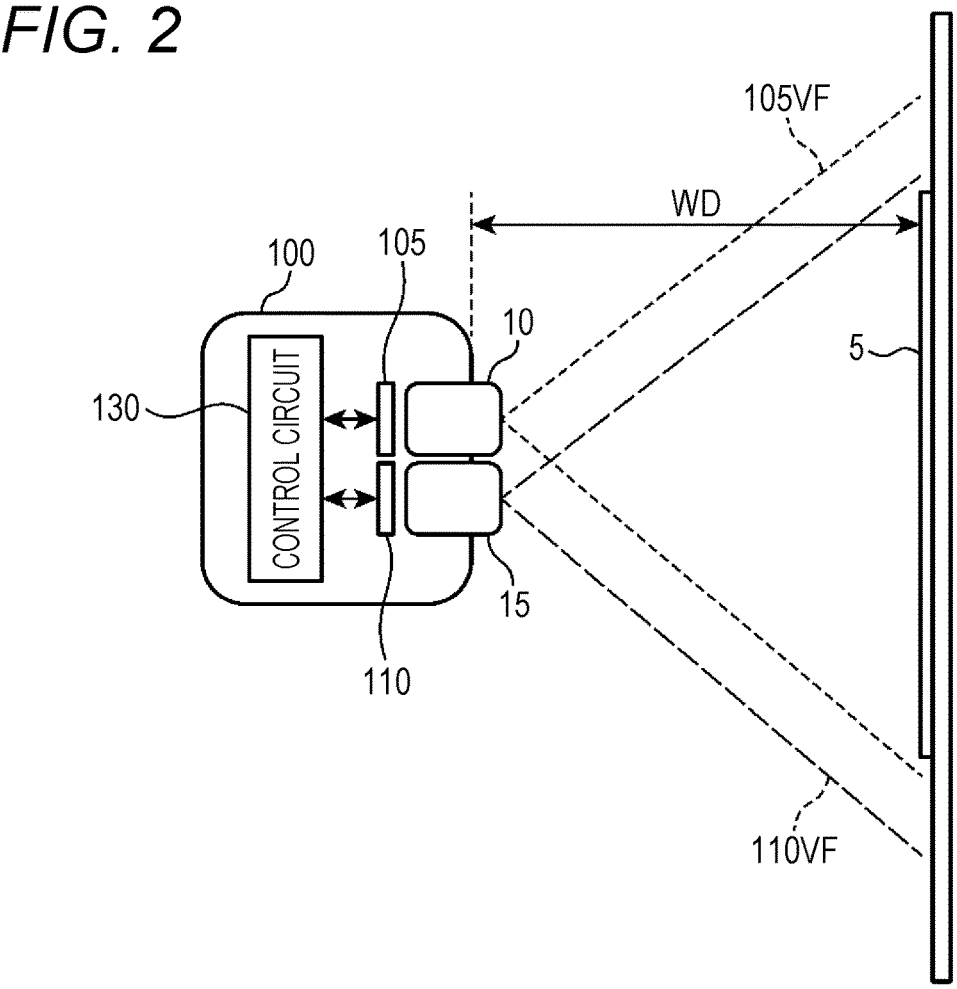
FIG. 2 is a side view schematically showing a measurement state of the device for measuring two-dimensional flicker.

FIG. 1 is a block diagram schematically showing an example of an electrical configuration of a device for measuring two-dimensional flicker of a first embodiment. FIG. 2 is a side view schematically showing a measurement state of the device for measuring two-dimensional flicker.

As shown in FIG. 2, a device for measuring two-dimensional flicker 100 two-dimensionally measures flicker generated on a display screen of a measurement target object 5. The measurement target object 5 is a device having a display screen, such as a liquid crystal display. As shown in FIGS. 1 and 2, the device for measuring two-dimensional flicker 100 of the first embodiment includes lenses 10 and 15, two-dimensional sensors 105 and 110, a distance sensor 115, an input unit 120, and a control circuit 130. The control circuit 130 includes a memory 140, a central processing unit (CPU) 150, and a peripheral circuit (not shown).

The memory 140 is configured by, for example, a semiconductor memory or the like. The memory 140 includes, for example, a read-only memory (ROM), a random access memory (RAM), an electrically erasable programmable ROM (EEPROM), and the like. For example, the ROM of the memory 140 stores a control program, of the present embodiment, that operates the CPU 150. The CPU 150 functions as a measurement region setting unit 151, a sensor control unit 152, and a measurement processing unit 153, by operating in accordance with the control program of the present embodiment stored in the memory 140. Functions of the measurement region setting unit 151, the sensor control unit 152, and the measurement processing unit 153 will be described later.

The lenses 10 and 15 (corresponding to an example of an optical system) form an image of the measurement target object 5 on a light receiving surface of the two-dimensional sensors 105 and 110, respectively. The two-dimensional sensors 105 and 110 individually include a plurality of photoelectric conversion elements (for example, photodiodes) that are two-dimensionally arranged in a row direction X and a column direction Y (FIG. 3), and are electrically connected to the control circuit 130. The two-dimensional sensors 105 and 110 are, for example, complementary metal oxide semiconductor (CMOS) image sensors, each having the same characteristics. The two-dimensional sensors 105 and 110 have fields of view 105VF and 110VF, respectively, through the lenses 10 and 15.

Figure 3:
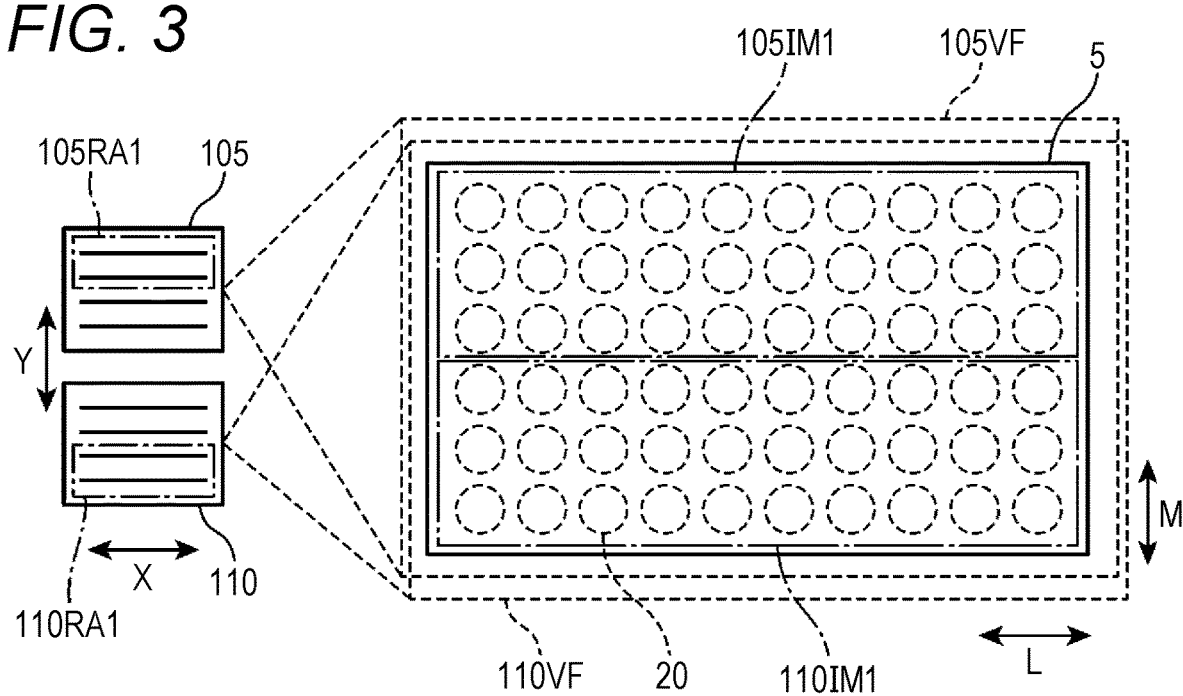
FIG. 3 is a view schematically showing a partial readout region of a two-dimensional sensor and a partial imaging region of a measurement target object.

The two-dimensional sensors 105 and 110 are individually configured to sequentially scan in the column direction Y (FIG. 3) to perform a collective readout operation of collectively reading each pixel value of a plurality of photoelectric conversion elements arranged in the row direction X (FIG. 3). The two-dimensional sensors 105 and 110 individually have a partial readout function of reading out only a pixel value of some of photoelectric conversion elements included in set partial readout regions, among the entire plurality of photoelectric conversion elements. The sensor control unit 152 sets a partial readout region by designating a range of a part of multiple rows adjacent in the column direction Y (FIG. 3) as a readout row range for the two-dimensional sensors 105 and 110, individually. From the two-dimensional sensors 105 and 110 individually, each pixel value of each photoelectric conversion element included in the range of the multiple rows designated as the readout row range is read out by sequentially scanning in the column direction Y (FIG. 3) to perform the collective readout operation.

In the two-dimensional sensors 105 and 110, time for reading a pixel value in one row is determined depending on a design of the sensor. Therefore, when the number of rows to be read is small, the time for reading the pixel value will be shortened. In other words, a frame rate can be increased by reducing the number of rows to be read. For example, when the number of rows to be read is halved from a total number of rows of the photoelectric conversion elements provided in the two-dimensional sensors 105 and 110, the frame rate can be doubled.

As shown in FIG. 2, a set of the lens 10 and the two-dimensional sensor 105 and a set of the lens 15 and the two-dimensional sensor 110 are arranged vertically side by side at a short interval. Therefore, an overlapping region between the field of view 105VF of the two-dimensional sensor 105 and the field of view 110VF of the two-dimensional sensor 110 is large. The set of the lens 10 and the two-dimensional sensor 105 and the set of the lens 15 and the two-dimensional sensor 110 may be arranged such that the interval in between is shortest (that is, housings are abutted with each other). In that case, the overlapping region between the field of view 105VF of the two-dimensional sensor 105 and the field of view 110VF of the two-dimensional sensor 110 is maximized.

The distance sensor 115 is electrically connected to the control circuit 130, and is controlled by the sensor control unit 152 to detect a work distance (WD), which is a distance between the measurement target object 5 and the device for measuring two-dimensional flicker 100. The distance sensor 115 outputs the detected WD to the control circuit 130. The sensor control unit 152 stores the WD detected by the distance sensor 115, in the memory 140. The distance sensor 115 is configured by, for example, a laser distance sensor. Without limiting to the laser distance sensor, the distance sensor 115 may be configured by another sensor capable of detecting the WD, such as an ultrasonic sensor or an infrared sensor.

In the present embodiment, as shown in FIG. 2, the WD is set to a distance along a horizontal direction between a surface of the measurement target object 5 and a surface of a housing of the device for measuring two-dimensional flicker 100. Without limiting to this, the WD may be set to a distance along the horizontal direction between the surface of the measurement target object 5 and a light receiving surface of the two-dimensional sensors 105 and 110, may be set to a distance along the horizontal direction between the surface of the measurement target object 5 and an in-focus position of the lenses 10 and 15, or may be set to a distance along the horizontal direction between the surface of the measurement target object 5 and a distal end of the lenses 10 and 15.

The input unit 120 is equipment operated by a user, and may be, for example, a touch panel that also serves as a display unit. The user can use the input unit 120 to input, for example, required S/N and a required resolution in flicker measurement.

FIG. 3 is a view schematically showing a partial readout region of the two-dimensional sensor and a partial imaging region on the measurement target object. A function of the measurement region setting unit 151 will be described with reference to FIGS. 1 and 3. The measurement region setting unit 151 two-dimensionally sets a plurality of measurement regions 20 for measurement of flicker on the measurement target object 5.

Specifically, the measurement region setting unit 151 determines a size of the measurement region 20 in accordance with the required S/N, inputted with use of the input unit 120, in the flicker measurement. For example, an increase of a size of the measurement region 20 increases the number of photoelectric conversion elements of the two-dimensional sensors 105 and 110 that acquire a pixel value of the measurement region 20. This increases a pixel value of the measurement region 20, and therefore the S/N becomes high.

The measurement region setting unit 151 determines a pitch of the measurement regions 20 on the basis of a required resolution, inputted with use of the input unit 120, in the flicker measurement. For example, when high-resolution flicker measurement is required, a pitch between the measurement regions 20 is shortened, and a density of the measurement regions 20 on the measurement target object 5 increases. Note that the measurement region setting unit 151 may set each measurement region 20 in accordance with information such as center coordinates and a radius of each measurement region 20, which has been directly inputted by the user using the input unit 120.

In this first embodiment, as shown in FIG. 3, the measurement region setting unit 151 two-dimensionally sets a total of 60 pieces of the measurement region 20 of ten pieces in a row direction L and six pieces in a column direction M. The measurement region setting unit 151 stores, in the memory 140, information on the set measurement region 20, for example, such as center coordinates and a radius of each measurement region 20. In the example of FIG. 3, 60 pieces of the measurement region 20 are set, but the number is not limited to this as long as the number is plural. In this first embodiment, the measurement region 20 is set to have a circular shape, but the measurement region 20 is not limited to this, and may have another shape such as a rectangle.

Figure 4:
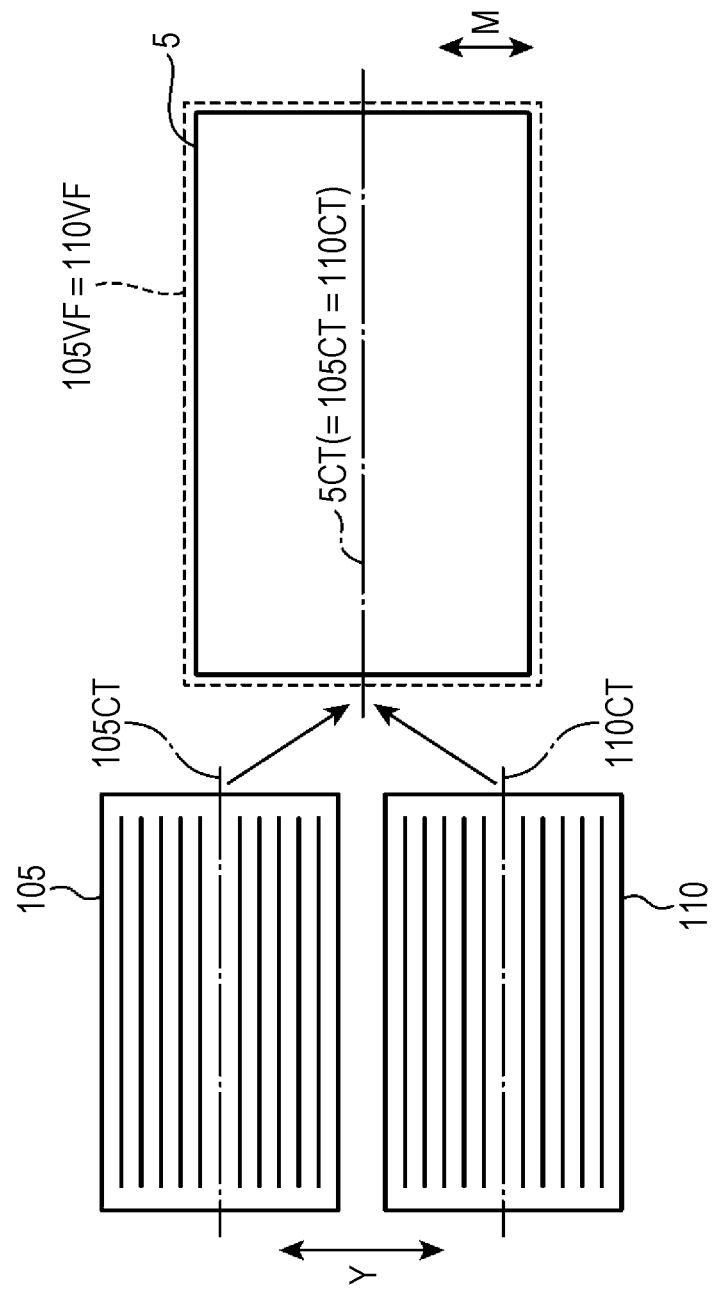
FIG. 4 is a view schematically showing a field of view of each two-dimensional sensor when a WD is at infinity.

FIG. 4 is a view schematically showing a field of view of each two-dimensional sensor when the WD is at infinity.

Figure 5:
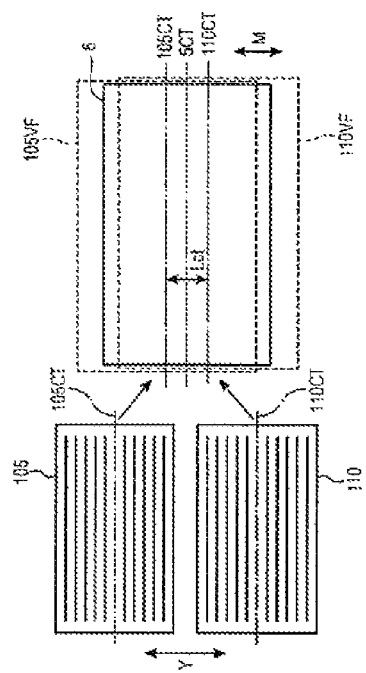
FIG. 5 is a view schematically showing a field of view of each two-dimensional sensor when the WD approaches a finite value from infinity.

FIG. 5 is a view schematically showing a field of view of each two-dimensional sensor when the WD approaches a finite value from infinity. A function of the sensor control unit 152 will be described with reference to FIGS. 1 and 3 to 5. The sensor control unit 152 sets a partial readout region of the two-dimensional sensors 105 and 110.

As shown in FIG. 4, when the WD is at infinity, the field of view 105VF of the two-dimensional sensor 105 and the field of view 110VF of the two-dimensional sensor 110 are coincident. Therefore, a center line 105CT in the column direction Y of the two-dimensional sensor 105 and a center line 110CT in the column direction Y of the two-dimensional sensor 110 coincides with a center line 5CT in the column direction M of the measurement target object 5.

On the other hand, when the WD approaches from infinity to reach a finite value, as shown in FIG. 5, the field of view 105VF of the two-dimensional sensor 105 shifts upward in the column direction M, and the field of view 110VF of the two-dimensional sensor 110 shifts downward in the column direction M. Therefore, with respect to the center line 5CT in the column direction M of the measurement target object 5, the center line 105CT in the column direction M of the two-dimensional sensor 105 shifts upward in the column direction M, and the center line 110CT in the column direction M of the two-dimensional sensor 110 shifts downward in the column direction M. As a result, the center line 105CT and the center line 110CT are separated by a distance Lct on the measurement target object 5.

A description is given to necessity of changing setting of a partial readout region when the partial readout region is set by the sensor control unit 152 with the center line as a reference in the states of FIGS. 4 and 5. It is assumed that, in the state where the WD is at infinity in FIG. 4, an upper half of the two-dimensional sensor 105 is set as a partial readout region with the center line 105CT as a boundary in accordance with a partial imaging region of an upper half of the measurement target object 5 with the center line 5CT as a boundary, and a lower half of the two-dimensional sensor 110 is set as a partial readout region with the center line 110CT as a boundary in accordance with a partial imaging region of a lower half of the measurement target object 5 with the center line 5CT as a boundary.

In this case, when the WD approaches from infinity to reach a finite value, as shown in FIG. 5, a partial imaging region where a pixel value is acquired by a photoelectric conversion element in the partial readout region set in the upper half of the two-dimensional sensor 105 shifts upward, while a partial imaging region where a pixel value is acquired by a photoelectric conversion element in the partial readout region set in the lower half of the two-dimensional sensor 110 shifts downward. As a result, when the setting of the partial readout region is not changed, a pixel value in a range of the distance Lct between the center line 105CT and the center line 110CT is not to be acquired on the measurement target object 5.

Conversely, it is assumed that, in a state where the WD is at infinity in FIG. 4, a lower half of the two-dimensional sensor 105 is set as a partial readout region with the center line 105CT as a boundary in accordance with a partial imaging region of a lower half of the measurement target object 5 with the center line 5CT as a boundary, and an upper half of the two-dimensional sensor 110 is set as a partial readout region with the center line 110CT as a boundary in accordance with a partial imaging region of an upper half of the measurement target object 5 with the center line 5CT as a boundary.

In this case, when the WD approaches from infinity to reach a finite value, as shown in FIG. 5, a partial imaging region where a pixel value is acquired by a photoelectric conversion element in the partial readout region set in the lower half of the two-dimensional sensor 105 shifts upward, while a partial imaging region where a pixel value is acquired by a photoelectric conversion element in the partial readout region set in the upper half of the two-dimensional sensor 110 shifts downward. As a result, when the setting of the partial readout region is not changed, a pixel value in a range of the distance Lct between the center line 105CT and the center line 110CT is to be redundantly acquired on the measurement target object 5. A pixel value outside a range of the field of view 110VF of the two-dimensional sensor 110 on an upper end side of the measurement target object 5, and a pixel value outside a range of the field of view 105VF of the two-dimensional sensor 105 on a lower end side of the measurement target object 5 are not to be acquired.

The distance Lct between the center line 105CT and the center line 110CT in FIG. 5 is expressed by a function of the WD. Therefore, the function of the WD representing the distance Lct is stored in the memory 140 in advance. The sensor control unit 152 designates a readout row range of the two-dimensional sensors 105 and 110, on the basis of the WD set at the time of flicker measurement and the WD function stored in the memory 140. The designated readout row range includes multiple rows adjacent in the column direction.

In the example of FIG. 3, the sensor control unit 152 sets partial imaging regions 105IM1 and 110IM1, by dividing an entire imaging region including the entire plurality of measurement regions 20 set on the measurement target object 5 into pieces of a number of the two-dimensional sensors 105 and 110 (that is, two) such that a division boundary line is parallel to the row direction X of the two-dimensional sensors 105 and 110. The sensor control unit 152 sets a partial readout region 105RA1 of the two-dimensional sensor 105 so that a pixel value of the partial imaging region 105IM1 of the measurement target object 5 is acquired, and sets a partial readout region 110RA1 of the two-dimensional sensor 110 so that a pixel value of the partial imaging region 110IM1 of the measurement target object 5 is acquired. This allows pixel values of all the measurement regions 20 to be acquired. In this way, as compared with a case of entirely reading out, the sensor control unit 152 can increase a readout speed by using the partial readout function of the two-dimensional sensors 105 and 110. Therefore, a pixel value of the measurement region 20 of the measurement target object 5 can be acquired at a desired frame rate. As a result, flicker measurement can be performed without deterioration of the measurement accuracy.

As described above, the entire imaging region including the entire plurality of measurement regions 20 is divided such that the division boundary line is parallel to the row direction X of the two-dimensional sensors 105 and 110, and the partial imaging regions 105IM1 and 110IM1 are set. In other words, a division direction of the partial imaging regions 105IM1 and 110IM1 of the measurement target object 5 is the column direction M parallel to the column direction Y of the two-dimensional sensors 105 and 110. Therefore, even when the WD changes, the partial imaging region is moved in the column direction M by simply changing a range of multiple rows designated as the readout row range, which enables pixel values of all the measurement regions 20 to be continuously acquired.

For example, the WD changes when a region containing all the measurement regions 20 of the measurement target object 5 changes, more specifically, when a size of the measurement target object 5 changes. As the WD changes, a relative positional relationship between the fields of view 105VF and 110VF of the two-dimensional sensors 105 and 110 changes. For example, when a size of the measurement target object 5 becomes smaller, it is preferable to bring the WD closer in order to measure with high accuracy. When the WD is made closer, as described with reference to FIGS. 4 and 5, the center lines 105CT and 110CT of the fields of view 105VF and 110VF of the two-dimensional sensors 105 and 110 shift in a direction away from each other. That is, the relative positional relationship of the partial readout regions 105RA1 and 110RA1 of the two-dimensional sensors 105 and 110 between with the partial imaging regions 105IM1 and 110IM1 on the measurement target object 5 changes in the division direction (the column direction M).

As described above, configuration is made such that this division direction (the column direction M) is parallel to the column direction Y of the two-dimensional sensors 105 and 110. This enables movement of the partial imaging regions 105IM1 and 110IM1 in the column direction M by simply moving the partial readout regions 105RA1 and 110RA1 of the two-dimensional sensors 105 and 110 individually in the column direction Y (that is, moving the readout row range designated as the partial readout regions 105RA1 and 110RA1 in the column direction Y). As a result, it becomes possible to acquire pixel values of all the measurement regions 20. In this way, adjustment when the WD changes becomes easy. As a result, it is not necessary to provide an adjustment mechanism for mechanical adjustment of positions of the two-dimensional sensor 105 and the lens 10 and positions of the two-dimensional sensor 110 and the lens 15. Therefore, the size of the device for measuring two-dimensional flicker 100 can be reduced.

As shown in FIG. 2, an overlap of the fields of view 105VF and 110VF of the two-dimensional sensors 105 and 110 is large. If the WD is too close and the fields of view 105VF and 110VF of the two-dimensional sensors 105 and 110 are separated, the entire measurement region 20 can no longer be contained. Therefore, by maximizing the overlap of the fields of view in advance, it is possible to widen a short-distance side of the WD that allows measurement. For example, when the fields of view 105VF and 110VF of the two-dimensional sensors 105 and 110 overlap at a shortest shooting distance, the partial imaging region can be moved by simply moving each partial readout region in the column direction Y, which eliminates necessity of a mechanical adjustment mechanism. As a result, flicker measurement at high magnification becomes possible with the WD in close proximity Note that the shortest shooting distance is a value determined depending on the lens, and is a shortest distance that enables focusing, that is, a minimum value of the WD. The shortest shooting distance generally means a distance from the measurement target object 5 to the light receiving surface of the two-dimensional sensors 105 and 110.

Returning to FIG. 1, the measurement processing unit 153 stores, in the memory 140, pixel values that are outputted from the two-dimensional sensors 105 and 110 and are of the photoelectric conversion elements included in the partial readout regions 105RA1 and 110RA1. The measurement processing unit 153 obtains a flicker value by using pixel values stored in the memory 140. A flicker value measurement method generally includes a contrast method and a Japan Electronics and Information Technology Industries Association (JEITA) method. The measurement processing unit 153 obtains the flicker value by, for example, a method specified from the contrast method and the JEITA method by the user using the input unit 120.

Figure 6:
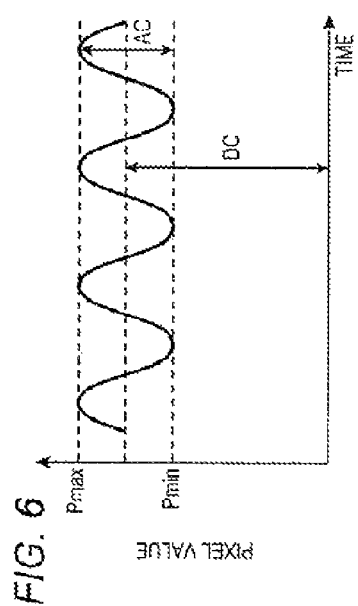
FIG. 6 is a view schematically showing a temporal transition of a pixel value in one measurement region 20.

FIG. 6 is a view schematically showing a temporal transition of a pixel value in one measurement region 20. As shown in FIG. 6, the pixel value can be seen to have an alternating current component AC stacked on top of a direct current component DC. Assuming that a maximum value of the pixel value is Pmax and a minimum value is Pmin, the pixel value is a value in which Pmax and Pmin are alternately repeated. A flicker value by the contrast method is defined as Flicker value=AC/DC. In other words, the flicker value by the contrast method is defined as $$\text{Flicker value}=(P\text{max}-P\text{min})/\{(P\text{max}+P\text{min})/2\} \quad (1).$$

For example, the measurement processing unit 153 obtains the maximum value Pmax and the minimum value Pmin from the pixel values stored in the memory 140, and obtains the flicker value by Formula (1).

Figure 7:
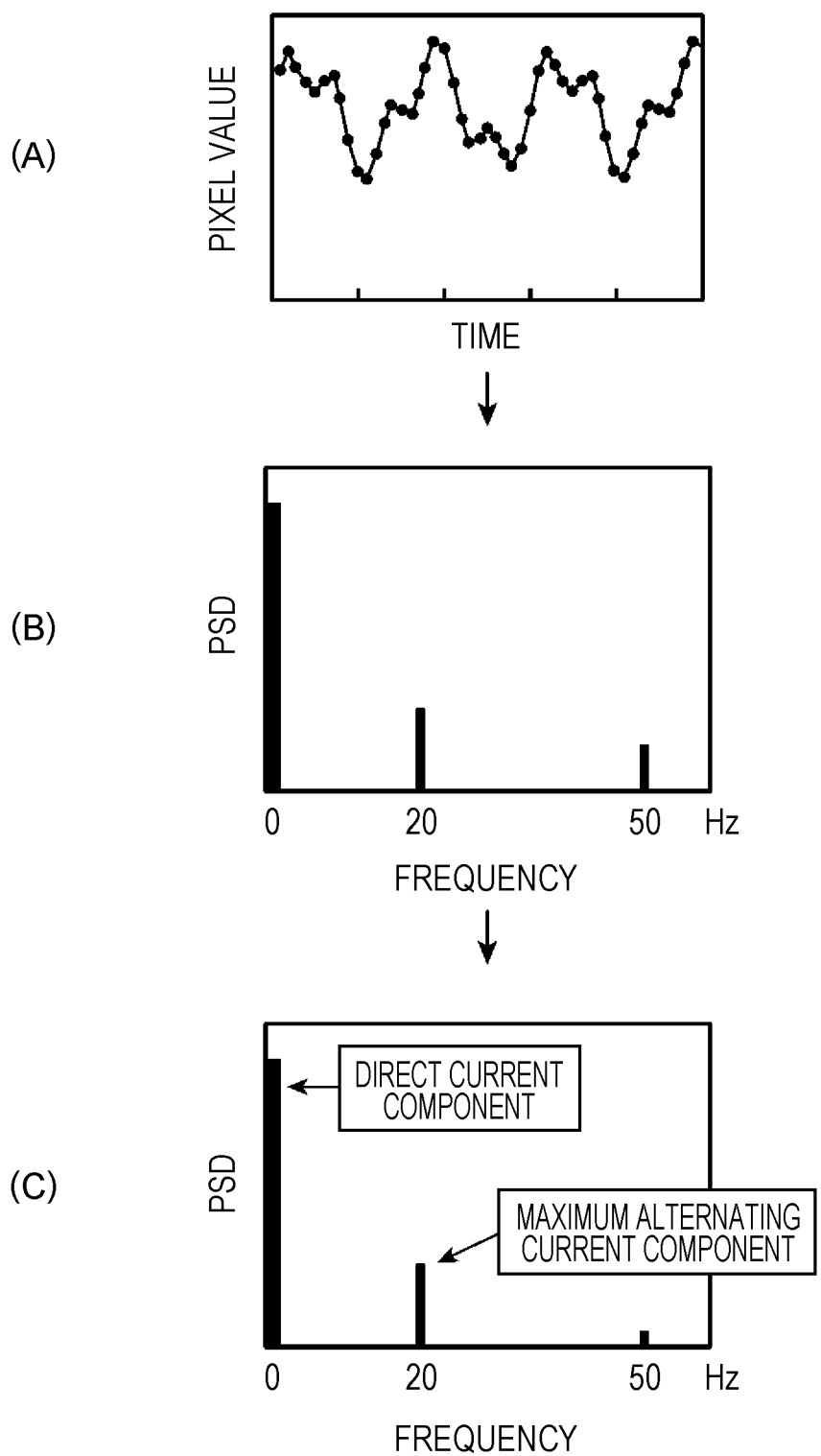
FIG. 7 is a view schematically showing a procedure for measurement of a flicker value by a JEITA method.

FIG. 7 is a view schematically showing a procedure for measurement of a flicker value by the JEITA method. Section (A) of FIG. 7 shows a state where the pixel value is converted from an analog value to a digital value by the measurement processing unit 153. Section (B) of FIG. 7 shows a result of fast Fourier transform of the pixel value converted into the digital value by the measurement processing unit 153, that is, a power spectral density (PSD) for each frequency. In the example of FIG. 7, frequency components included in the pixel value are a 0 Hz component (a direct current component), a 20 Hz component, and a 50 Hz component. Section (C) of FIG. 7 shows a PSD obtained by the measurement processing unit 153 correcting the PSD of section (B) with frequency response characteristics of a human eye. The measurement processing unit 153 obtains a flicker value of the JEITA method by using a value of a direct current component and a value of a maximum alternating current component in the PSD of section (C).

Figure 8:
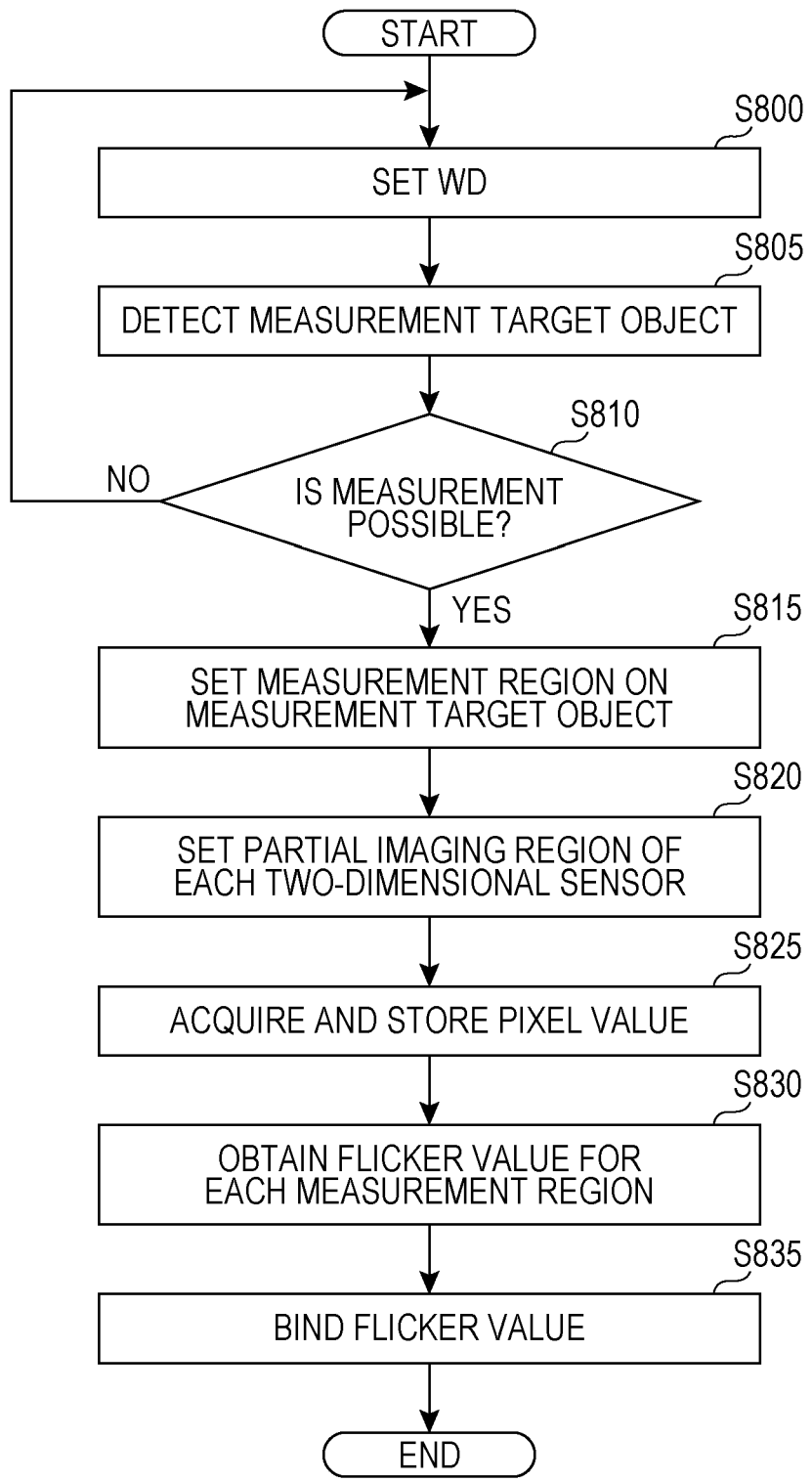
FIG. 8 is a flowchart schematically showing a procedure of a measurement operation of the device for measuring two-dimensional flicker according to the first embodiment.

FIG. 8 is a flowchart schematically showing a procedure of a measurement operation of the device for measuring two-dimensional flicker 100 according to the first embodiment. For example, when the user operates a measurement switch (not shown) provided on a surface of the device for measuring two-dimensional flicker 100, the operation shown in FIG. 8 is started.

In step S800, the sensor control unit 152 controls the distance sensor 115, and stores a WD detected by the distance sensor 115 in the memory 140. In step S805, the sensor control unit 152 detects the measurement target object 5. For example, the sensor control unit 152 controls the two-dimensional sensors 105 and 110 to acquire pixel values of all the photoelectric conversion elements, performs image processing, and detects an edge of a display surface of the measurement target object 5. For example, when the measurement target object 5 is rectangular, the sensor control unit 152 stores coordinates of four corners, in the memory 140. The sensor control unit 152 may check fields of view of the two-dimensional sensors 105 and 110 and guide the user so that the measurement target object 5 is positioned at a center of the fields of view via a display on the touch panel or voice.

In step S810, the sensor control unit 152 determines whether or not flicker measurement is possible. When it is determined that flicker measurement is possible (YES in step S810), the process proceeds to step S815. Whereas, when it is determined that flicker measurement is not possible (NO in step S810), the process returns to step S800. For example, when the entire measurement target object 5 is not included in the fields of view of the two-dimensional sensors 105 and 110, the user moves the measurement target object 5 away from the device for measuring two-dimensional flicker 100, and executes the WD setting again in step S800.

In step S815, the measurement region setting unit 151 sets the measurement region 20 on the measurement target object 5, for example, in accordance with required S/N, a required resolution, and the like. The measurement region setting unit 151 stores information on the set measurement region 20, in the memory 140. In step S820, the sensor control unit 152 divides an entire imaging region containing all the set measurement regions 20 into two in the column direction M, to set two partial imaging regions. The sensor control unit 152 sets the partial readout regions of the two-dimensional sensors 105 and 110 so that the pixel values of the two set partial imaging regions can be acquired. That is, the sensor control unit 152 designates a readout row range (that is, a range of a part of multiple rows adjacent in the column direction Y) to be read out from the two-dimensional sensors 105 and 110.

In step S825, the sensor control unit 152 controls the two-dimensional sensors 105 and 110 to acquire a pixel value of the partial imaging region of the measurement target object 5, with the partial readout region of the two-dimensional sensors 105 and 110 at a predetermined frame rate for a predetermined time, and stores in the memory 140. It is preferable that the sensor control unit 152 starts the acquisition of the pixel value by the two-dimensional sensor 105 and the acquisition of the pixel value by the two-dimensional sensor 110 at the same time. This is because timing of the flicker detected by both is to be the same. On the other hand, when the acquisition of the pixel value by the two-dimensional sensor 105 and the acquisition of the pixel value by the two-dimensional sensor 110 are not started at the same time, the timing of the detected flicker is different. However, since the flicker value itself does not change, both need not start at the same time.

When acquisition of a pixel value for a predetermined time is ended, in step S830, the measurement processing unit 153 obtains a flicker value for each measurement region 20. Specifically, from a position and a size of the measurement region 20, the measurement processing unit 153 determines photoelectric conversion elements included in the partial readout regions of the two-dimensional sensors 105 and 110 corresponding to the measurement region 20, for each measurement region 20. The measurement processing unit 153 adds up pixel values of the photoelectric conversion elements of the two-dimensional sensors 105 and 110 corresponding to the measurement region 20 for each measurement region 20. This adding up process is commonly referred to as "binning" The measurement processing unit 153 obtains a flicker value of the contrast method or the JEITA method for each measurement region 20 by using a time change of the added pixel value (see section (A) of FIGS. 6 and 7).

In step S835, the measurement processing unit 153 binds a flicker value obtained by the partial readout region 105RA1 of the two-dimensional sensor 105 with a flicker value obtained by the partial readout region 110RA1 of the two-dimensional sensor 110. This binding allows a flicker value of the measurement target object 5 to be obtained two-dimensionally for each measurement region 20.

As described above, according to the first embodiment, the sensor control unit 152 uses the partial readout function of the two-dimensional sensors 105 and 110 to read only pixel values of some of the photoelectric conversion elements included in the partial readout region. Therefore, the readout speed can be increased as compared with a case of entirely reading out. Therefore, a pixel value of the measurement region 20 of the measurement target object 5 can be acquired at a desired frame rate. As a result, flicker measurement can be performed without deterioration of the measurement accuracy.

Second Embodiment

Figure 9:
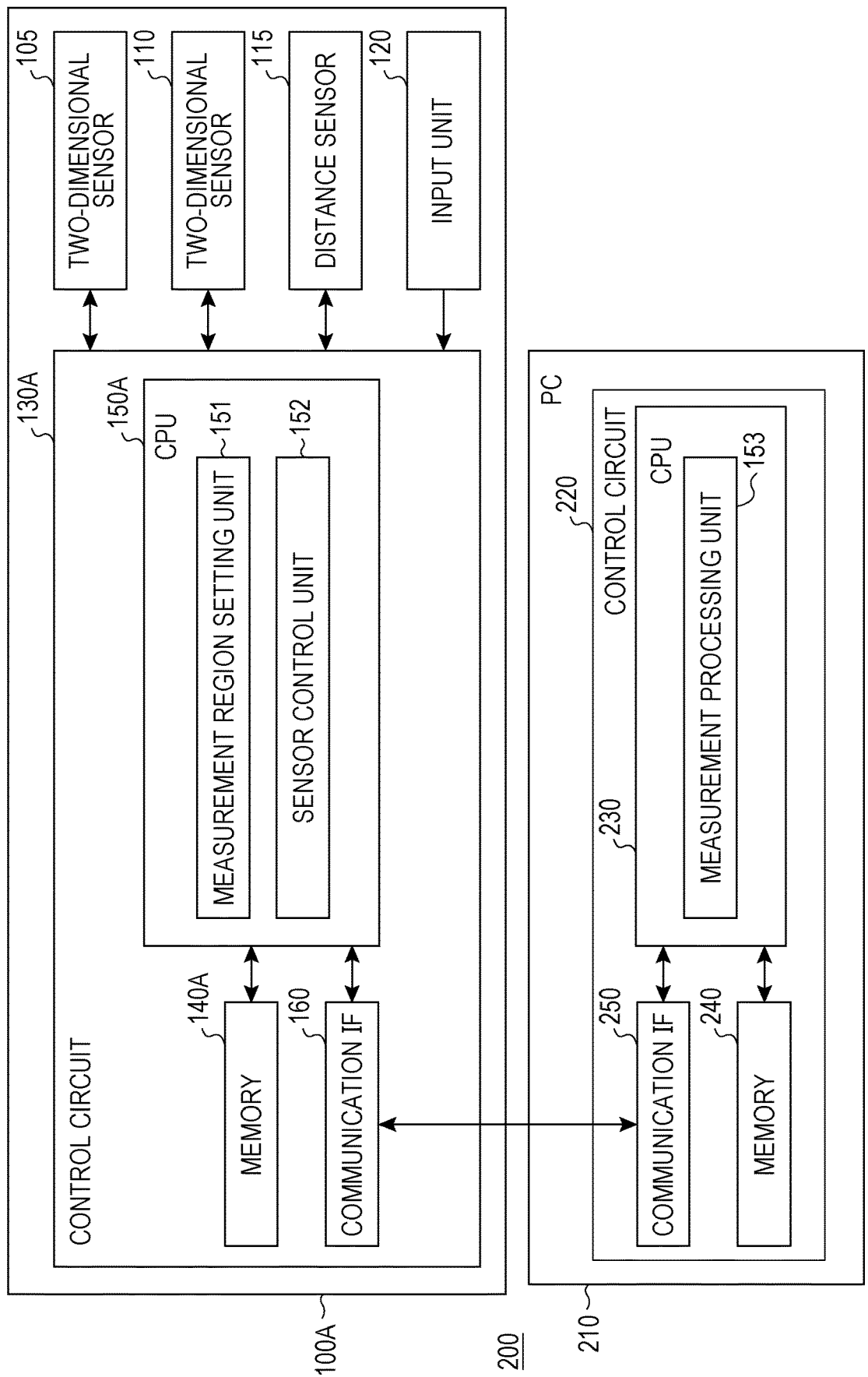
FIG. 9 is a block diagram schematically showing an example of an electrical configuration of a device for measuring two-dimensional flicker of a second embodiment.

FIG. 9 is a block diagram schematically showing an example of an electrical configuration of a device for measuring two-dimensional flicker 200 of a second embodiment. The device for measuring two-dimensional flicker 200 of the second embodiment includes a two-dimensional flicker measuring camera 100A and a personal computer (PC) 210.

The two-dimensional flicker measuring camera 100A has the same configuration as that of the device for measuring two-dimensional flicker 100 of the first embodiment, except that a control circuit 130A is provided in place of the control circuit 130. That is, the two-dimensional flicker measuring camera 100A includes lenses 10 and 15 (FIG. 2), two-dimensional sensors 105 and 110, a distance sensor 115, an input unit 120, and the control circuit 130A. The control circuit 130A includes a memory 140A, a CPU 150A, a communication interface (communication IF) 160, and a peripheral circuit (not shown).

The memory 140A is configured by, for example, a semiconductor memory or the like. The memory 140A includes, for example, a ROM, a RAM, an EEPROM, and the like. For example, the ROM of the memory 140A stores a control program, of the present embodiment, that operates the CPU 150A. The CPU 150A functions as a measurement region setting unit 151 and a sensor control unit 152, by operating in accordance with the control program of the present embodiment stored in the memory 140A. Functions of the measurement region setting unit 151 and the sensor control unit 152 are the same as those in the first embodiment.

The communication IF 160 is a communication circuit connected to the CPU 150A, and for performing communication under control of the CPU 150A. The communication IF 160 includes a communication interface circuit according to a predetermined standard. The communication IF 160 generates, in accordance with the above standard, a communication signal containing data that is inputted from the CPU 150A and to be transmitted (for example, information such as a position and a size of the measurement region 20, information such as a pixel value of a photoelectric conversion element corresponding to the measurement region 20 in a partial readout region, or the like), and transmits the generated communication signal to the PC 210 by wire or wirelessly. The communication IF 160 receives a communication signal transmitted from the PC 210. The CPU 150A stores, in the memory 140A, data contained in the communication signal received by the communication IF 160.

The PC 210 includes a control circuit 220. The control circuit 220 includes a memory 240, a CPU 230, a communication IF 250, and a peripheral circuit (not shown). The memory 240 is configured by, for example, a semiconductor memory or a hard disk. The memory 240 includes, for example, a ROM, a RAM, an EEPROM, and the like. For example, the ROM of the memory 240 stores a control program, of the present embodiment, that operates the CPU 230. The CPU 230 functions as a measurement processing unit 153 by operating in accordance with the control program of the present embodiment stored in the memory 240. A function of the measurement processing unit 153 is the same as that of the first embodiment.

The communication IF 250 is a communication circuit connected to the CPU 230, and for performing communication under control of the CPU 230. The communication IF 250 includes a communication interface circuit according to the same standard as the communication IF 160. The communication IF 250 receives a communication signal transmitted from the communication IF 160. The CPU 230 stores, in the memory 240, data contained in the communication signal received by the communication IF 250. The communication IF 250 generates, in accordance with the above standard, a communication signal containing data that is inputted from the CPU 230 and to be transmitted, and transmits the generated communication signal to the two-dimensional flicker measuring camera 100A.

As described above, in the second embodiment, the function of the CPU 150 (FIG. 1) of the first embodiment is divided for the CPU 150A and the CPU 230. Even in such a second embodiment, an effect similar to that of the first embodiment can be obtained. Note that a mouse and a keyboard (not shown) of the PC 210 may be configured to function as the input unit 120.

Third Embodiment

Figure 10:
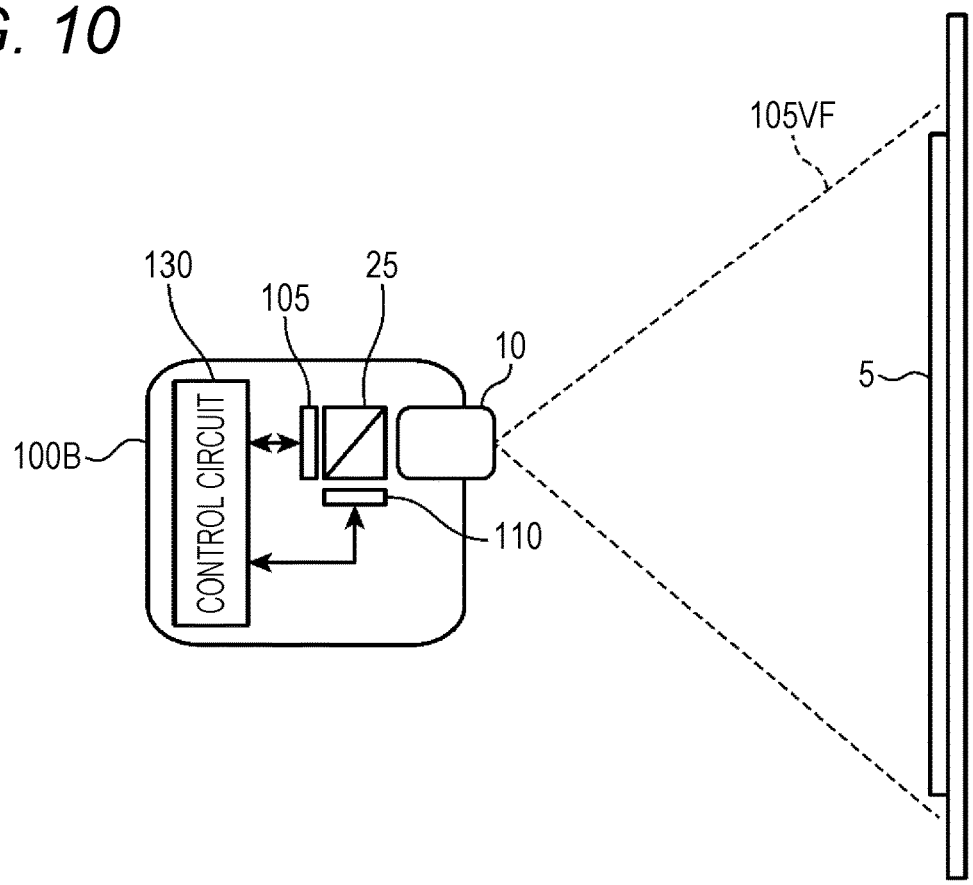
FIG. 10 is a side view schematically showing a measurement state of a device for measuring two-dimensional flicker of a third embodiment.
Figure 11:
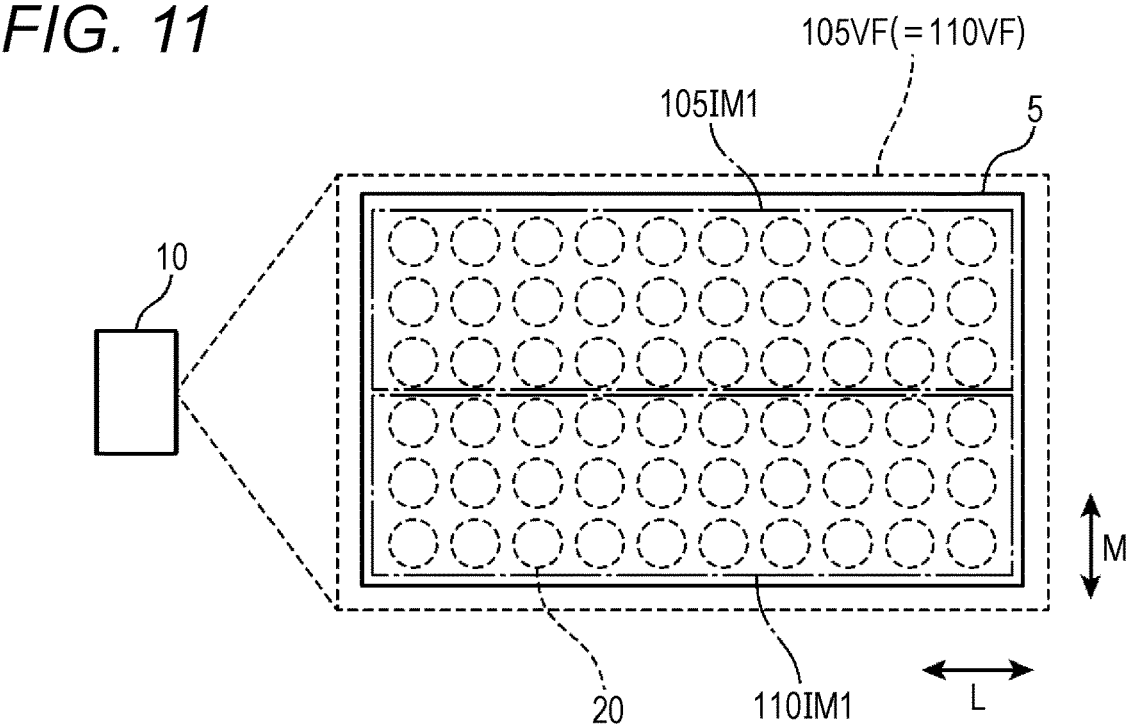
FIG. 11 is a view schematically showing a field of view and a partial imaging region of the two-dimensional sensor.

FIG. 10 is a side view schematically showing a measurement state of a device for measuring two-dimensional flicker 100B of a third embodiment. FIG. 11 is a view schematically showing a field of view and a partial imaging region of the two-dimensional sensor.

The device for measuring two-dimensional flicker 100B of the third embodiment has the same configuration as that of the device for measuring two-dimensional flicker 100 of the first embodiment except that a half mirror 25 is provided instead of the lens 15. That is, the device for measuring two-dimensional flicker 100B of the third embodiment includes a lens 10, the half mirror 25, two-dimensional sensors 105 and 110, a distance sensor 115 (FIG. 1), an input unit 120 (FIG. 1), and a control circuit 130.

The half mirror 25 (corresponding to an example of an optical component) branches light from a measurement target object 5 into light directed to the two-dimensional sensor 105 and light directed to the two-dimensional sensor 110. The lens 10 forms an image of the measurement target object 5 transmitted through the half mirror 25 on a light receiving surface of the two-dimensional sensor 105, and forms an image of the measurement target object 5 reflected by the half mirror 25 on a light receiving surface of the two-dimensional sensor 110.

In this third embodiment, since the half mirror 25 is used, an amount of light incident on the two-dimensional sensors 105 and 110 is lower to an extent than that in the first embodiment. However, a required lens is only one lens 10. As shown in FIG. 11, a field of view 105VF of the two-dimensional sensor 105 and a field of view 110VF of the two-dimensional sensor 110 are completely coincident. Therefore, there is an advantage that, even when a WD changes, it is not necessary to change setting of a partial readout region for acquiring a pixel value of a partial imaging region 105IM1 and setting of a partial readout region for acquiring a pixel value of a partial imaging region 110IM1.

Meanwhile, as an optical component configured to branch the light from the measurement target object 5 into the light directed to the two-dimensional sensor 105 and the light directed to the two-dimensional sensor 110, for example, a dichroic mirror or an optical fiber may be used instead of the half mirror.

(Others)

(1) In FIG. 8 of the first embodiment, after the process of obtaining a flicker value for each measurement region 20 (step S830), the process of binding flicker values (step S835) is executed, but the present invention is not limited to this. For example, it is possible to execute the process of obtaining the flicker value after executing first the process of binding the pixel values of the photoelectric conversion elements of the partial readout regions 105RA1 and 110RA1 of the two-dimensional sensors 105 and 110 corresponding to the measurement region 20.

However, in this case, it is necessary to correct a variation between the two-dimensional sensor 105 and the two-dimensional sensor 110. For example, it is necessary to cause an output level of the two-dimensional sensor 105 to be coincident with an output level of the two-dimensional sensor 110, for example, by normalizing a pixel value of the two-dimensional sensor 105 and a pixel value of the two-dimensional sensor 110 with a maximum value. This makes it possible to prevent deterioration of flicker measurement accuracy.

(2) In FIG. 3 of the first embodiment, the partial imaging region 105IM1 of the measurement target object 5 in which a pixel value is acquired by the partial readout region 105RA1 of the two-dimensional sensor 105 is separated from the partial imaging region 110IM1 of the measurement target object 5 in which a pixel value is acquired by the partial readout region 110RA1 of the two-dimensional sensor 110. However, without limiting to this, both may be in contact or overlapped with each other. It suffices that the partial imaging region 105IM1 and the partial imaging region 110IM1 are set so as to include the entire measurement region 20 in the partial imaging region 105IM1 and the partial imaging region 110IM1.

Figure 12:
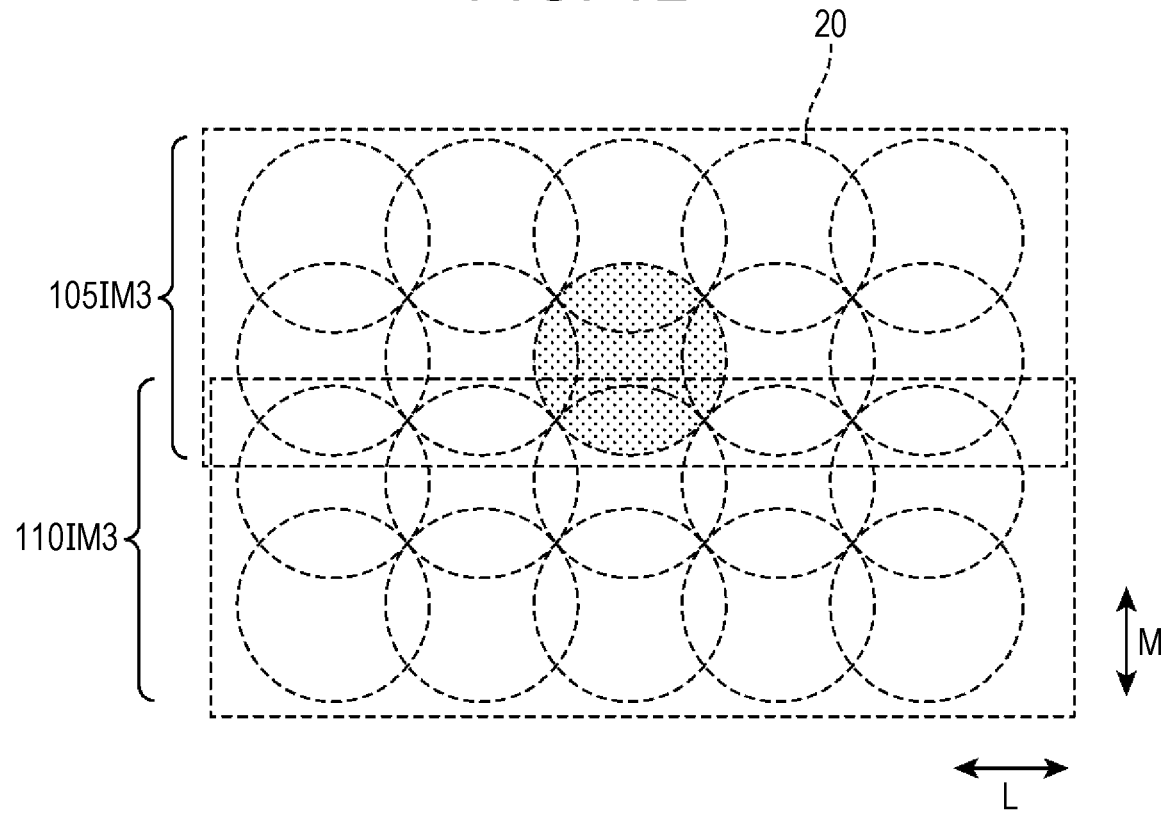
FIG. 12 is a view schematically showing another example of a partial imaging region.

FIG. 12 is a view schematically showing another example of a partial imaging region. In the example of FIG. 12, a size of the measurement region 20 is set larger than that of the example of FIG. 3, so that adjacent measurement regions 20 are overlapped with each other. Therefore, the number of photoelectric conversion elements of the two-dimensional sensors 105 and 110 that acquire pixel values of the measurement regions 20 in FIG. 12 becomes larger than the number of photoelectric conversion elements of the two-dimensional sensors 105 and 110 that acquire pixel values of the measurement regions 20 in FIG. 3, which increases pixel values used to calculate a flicker value. As a result, it becomes possible to measure flicker with high S/N.

In the example of FIG. 12, among the measurement regions 20 in four rows, the measurement regions 20 in upper two rows are included in the partial imaging region 105IM3 in which a pixel value is acquired by the partial readout region of the two-dimensional sensor 105 (FIG. 1), and the measurement regions 20 in lower two rows are included in the partial imaging region 110IM3 in which a pixel value is acquired by the partial readout region of the two-dimensional sensor 110 (FIG. 1). The measurement regions 20 in the second row and the measurement regions 20 in the third row are overlapped with each other. Therefore, unlike the example of FIG. 3, the partial imaging region 105IM3 and the partial imaging region 110IM3 are overlapped with each other. This allows each of the pixel values of the overlapping measurement regions 20 to be suitably acquired. It suffice that the partial readout region of the two-dimensional sensor 105 (FIG. 1) and the partial readout region of the two-dimensional sensor 110 (FIG. 1) are set so as to enable pixel values of the partial imaging region 105IM3 and the partial imaging region 110IM3 to be acquired individually.

Note that, in this specification, as shown in FIG. 12, even when the partial imaging region 105IM3 and the partial imaging region 110IM3 are partially overlapped with each other, the partial imaging regions 105IM3 and 110IM3 are considered to be set by dividing the entire imaging region of the measurement target object 5.

(3) In the first to third embodiments, two two-dimensional sensors 105 and 110 are used, but the present invention is not limited to this. By increasing the number of two-dimensional sensors to reduce the number of rows in the partial readout region in each two-dimensional sensor, a speed can be further increased.

Figure 13:
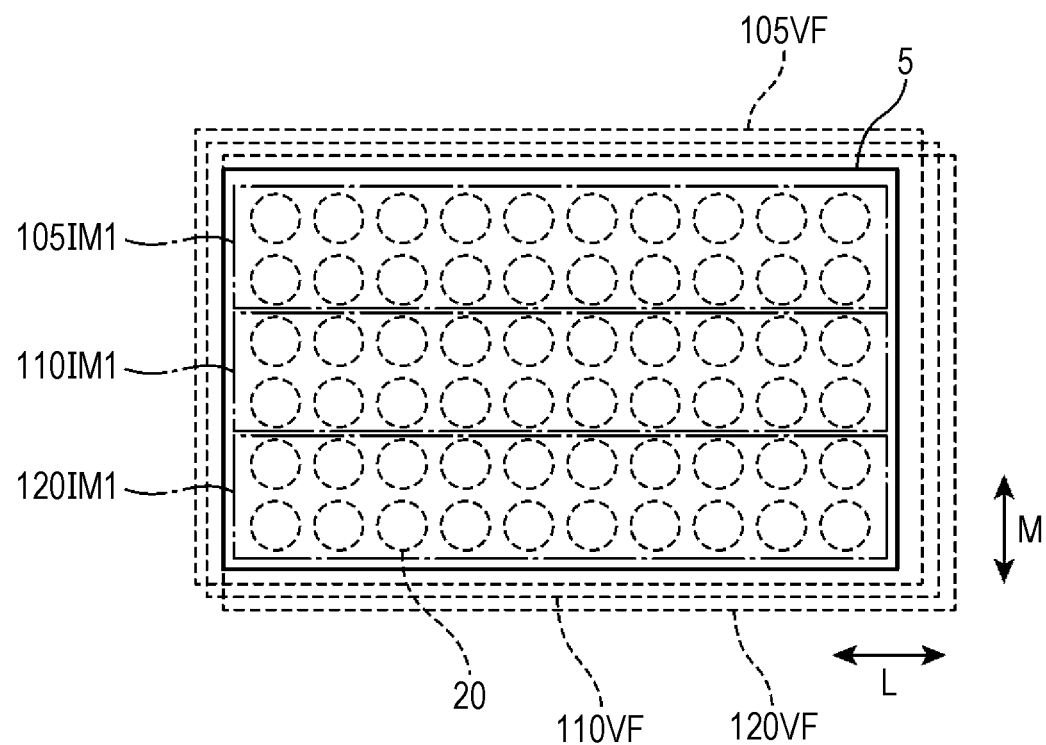
FIG. 13 is a view schematically showing a partial imaging region by three two-dimensional sensors.

FIG. 13 is a view schematically showing a partial imaging region by three two-dimensional sensors. FIG. 13 shows the fields of view 105VF and 110VF of the two-dimensional sensor 105 and 110 (FIG. 1) and a field of view 120VF of a third two-dimensional sensor, and further shows the partial imaging regions 105IM1 and 110IM1 in which pixel values are respectively acquired by the partial readout regions of the two-dimensional sensors 105 and 110 (FIG. 1), and a partial imaging region 120IM1 in which a pixel value is acquired by a partial readout region of the third two-dimensional sensor.

In the embodiment of FIG. 13, among the measurement regions 20 of six rows, the measurement regions 20 in the first and second rows are included in the partial imaging region 105IM1 in which a pixel value is acquired by the partial readout region of the two-dimensional sensor 105 (FIG. 1), the measurement regions 20 in the second and third rows are included in the partial imaging region 110IM1 in which a pixel value is acquired by the partial readout region of the two-dimensional sensor 110 (FIG. 1), and the measurement regions 20 in the fifth and sixth rows are included in the partial imaging region 120IM1 in which a pixel value is acquired by the partial readout region of the third two-dimensional sensor.

In the first embodiment (FIG. 3), the number of rows of the measurement region 20 included in the partial imaging regions 105IM1 and 110IM1 is three. Whereas, in the embodiment of FIG. 13, the number of rows of the measurement region 20 included in the partial imaging regions 105IM1 and 110IM1 is reduced to two. Therefore, in the embodiment of FIG. 13, the number of rows of the photoelectric conversion elements included in the partial readout regions of the two-dimensional sensors 105 and 110 (FIG. 1) that respectively acquire the pixel values of the partial imaging regions 105IM1 and 110IM1 is also reduced as compared with the first embodiment (FIG. 3). As a result, according to the embodiment of FIG. 13, a frame rate of the two-dimensional sensor can be increased as compared with the first embodiment.

Figure 14:
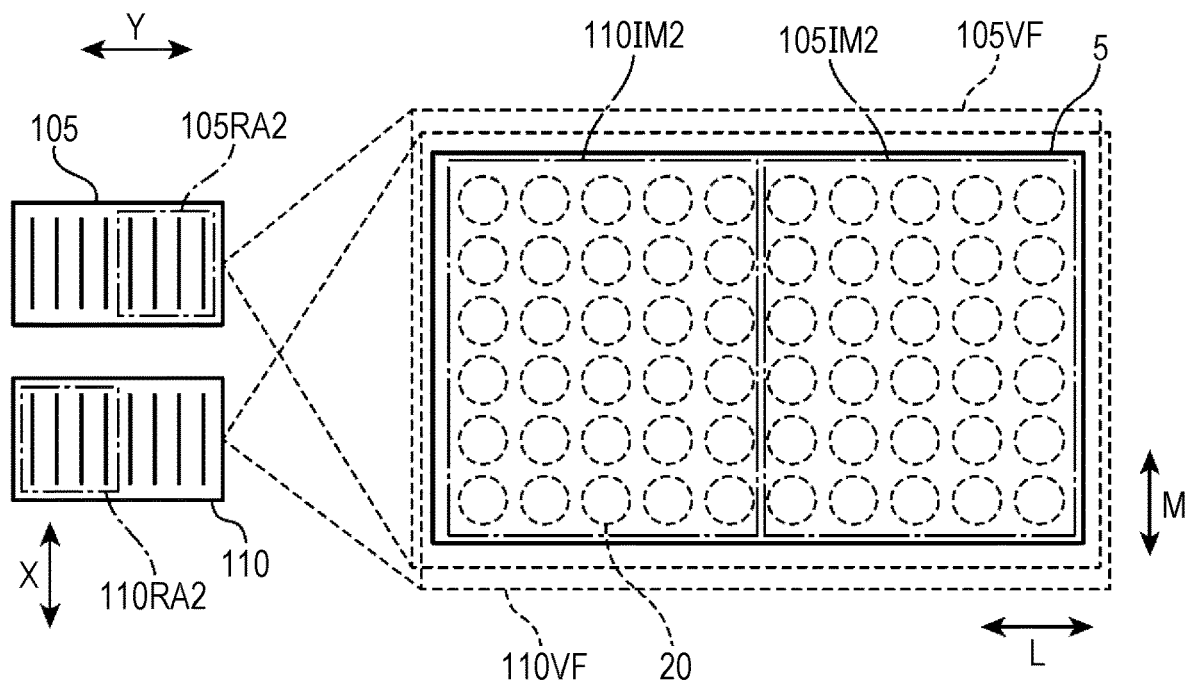
FIG. 14 is a view schematically showing a partial readout region and a partial imaging region when the two-dimensional sensor is tilted by 90° with respect to the first embodiment.

(4) FIG. 14 is a view schematically showing a partial readout region and a partial imaging region when the two-dimensional sensor is tilted by 90° with respect to the first embodiment.

In the embodiment of FIG. 14, the two-dimensional sensors 105 and 110 are arranged at an angle of 90° with respect to the first embodiment (FIG. 3). That is, the two-dimensional sensors 105 and 110 are arranged vertically side by side with the row direction X of the two-dimensional sensors 105 and 110 parallel to a vertical direction and the column direction Y of the two-dimensional sensors 105 and 110 parallel to a horizontal direction. Whereas, the fields of view 105VF and 110VF of the two-dimensional sensors 105 and 110 each contain the measurement target object 5, similarly to the first embodiment (FIG. 3).

In the embodiment of FIG. 14, setting of the partial imaging region of the measurement target object 5 by the sensor control unit 152 (FIG. 1) is different from that of the first embodiment (FIG. 3). The partial imaging region 105IM2 of the measurement target object 5 is set to include the measurement regions 20 of a right half of the measurement target object 5. That is, the partial imaging region 105IM2 is set to include five measurement regions 20 on a right side of the row direction L and all (six) measurement regions 20 in the column direction M, among the measurement regions 20 of the measurement target object 5.

Whereas, the partial imaging region 110IM2 of the measurement target object 5 is set to include the measurement regions 20 of a left half of the measurement target object 5. That is, the partial imaging region 110IM2 is set to include five measurement regions 20 on a left side of the row direction L and all (six) measurement regions 20 in the column direction M, among the measurement regions 20 of the measurement target object 5.

The partial readout region 105RA2 of the two-dimensional sensor 105 is set to acquire a pixel value of the partial imaging region 105IM2 of the measurement target object 5, while the partial readout region 110RA2 of the two-dimensional sensor 110 is set to acquire a pixel value of the partial imaging region 110IM2 of the measurement target object 5.

Thus, in the embodiment of FIG. 14, a boundary line between the partial imaging region 105IM2 and the partial imaging region 110IM2 obtained by dividing the entire imaging region of the measurement target object 5 is parallel to the column direction M, that is, parallel to the row direction X of the two-dimensional sensors 105 and 110. In other words, a division direction of the partial imaging regions 105IM2 and 110IM2 of the measurement target object 5 is the column direction M parallel to the column direction Y of the two-dimensional sensors 105 and 110. In this respect, the embodiment of FIG. 14 is the same as the first embodiment (FIG. 3).

Therefore, also in the embodiment of FIG. 14, similarly to the first embodiment, when a WD changes, the partial imaging regions 105IM2 and 110IM2 in which a pixel value is acquired by the partial readout regions 105RA2 and 110RA2 can be adjusted in the column direction M by simply changing a range of multiple rows of the photoelectric conversion element designated as a readout row range from the two-dimensional sensors 105 and 110. As a result, pixel values of all the measurement regions 20 can be continuously acquired.

In the embodiment of FIG. 14, the two-dimensional sensors 105 and 110 tilted by 90° are arranged vertically side by side similarly to the first embodiment (FIG. 3). However, without limiting to this, the two-dimensional sensors 105 and 110 may be arranged horizontally side by side. Even with such an arrangement, the partial readout regions 105RA2 and 110RA2 can be set similarly to the embodiment of FIG. 14.

Meanwhile, the user may determine an orientation of the two-dimensional sensor 105 and 110 in consideration of an aspect ratio of the two-dimensional sensors 105 and 110 and an aspect ratio of the measurement target object 5. For example, when the two-dimensional sensors 105 and 110 are horizontally long and the measurement target object 5 is horizontally long as in a television display, the two-dimensional sensors 105 and 110 are arranged vertically side by side as in the first embodiment (FIG. 2). Whereas, when the two-dimensional sensors 105 and 110 are vertically long and the measurement target object 5 is horizontally long, the two-dimensional sensors 105 and 110 are preferably tilted by 90° as shown in FIG. 14 and arranged vertically or horizontally side by side.

Figure 15:
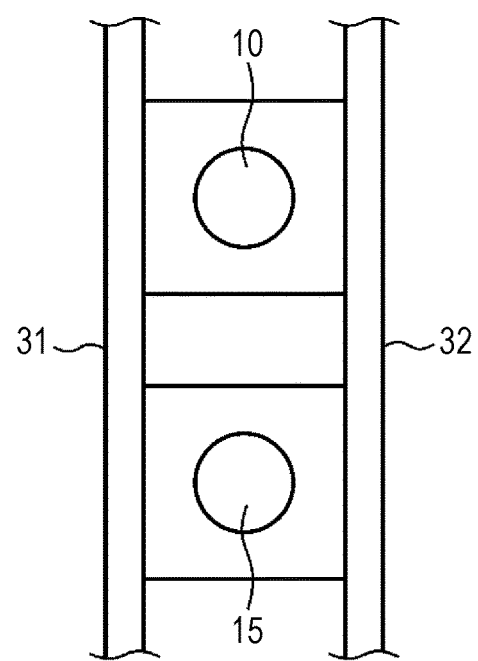
FIG. 15 is a view schematically showing a moving mechanism that vertically moves a set of a lens and a two-dimensional sensor.

(5) FIG. 15 is a view schematically showing a moving mechanism that vertically moves a set of a lens and a two-dimensional sensor. This moving mechanism includes rails 31 and 32 that support a set of the lens 10 and the two-dimensional sensor (not shown) and a set of the lens 15 and the two-dimensional sensor (not shown) from the left and right, and a motor (not shown) that vertically moves each set. By vertically moving each set by using this moving mechanism, a degree of overlap of fields of view of individual two-dimensional sensors can be adjusted.

(6) In each of the above embodiments, the field of view 105VF of the two-dimensional sensor 105 and the field of view 110VF of the two-dimensional sensor 110 are overlapped with each other. However, without limiting to this, both may not be overlapped with each other. It suffices that both the partial readout region 105RA1 of the two-dimensional sensor 105 and the partial readout region 110RA1 of the two-dimensional sensor 110 are configured to enable pixel values of all the measurement regions 20 to be acquired.

However, when the fields of view of the individual two-dimensional sensors are not overlapped with each other, and when an end of the measurement target object 5 is located within a range where the fields of view are not overlapped, it may not be possible to adjust the partial readout regions 105RA1 and 110RA1 by changing the designated readout row range so as to enable pixel values of all the measurement regions 20 to be acquired, when a WD changes.

As in the first embodiment (FIG. 3), when the entire measurement target object 5 is located within an overlapping range of the field of view 105VF of the two-dimensional sensor 105 and the field of view 110VF of the two-dimensional sensor 110, the partial readout regions 105RA1 and 110RA1 can be adjusted by changing the designation of the readout row range so as to enable pixel values of all the measurement regions 20 to be acquired, when a WD changes.

(7) In each of the above embodiments, the lenses 10 and 15 are arranged such that optical axes of the lenses 10 and 15 are parallel to each other in the horizontal direction, but the present invention is not limited to this. For example, the lenses 10 and 15 may be arranged such that the optical axes of the lenses 10 and 15 are oblique to an extent. A detection target of the two-dimensional sensors 105 and 110 is not an image of the measurement target object 5, but simply is a pixel value for flicker measurement. Therefore, even when light from the measurement target object 5 cannot be imaged on the entire light receiving surface of the two-dimensional sensors 105 and 110 due to tilting of the optical axis, and the image of the measurement target object 5 is blurred to an extent, the flicker measurement is not hindered.

As described above, according to the present embodiment, since each of the plurality of two-dimensional sensors can be operated at high speed, it becomes possible to two-dimensionally measure flicker of the measurement target object without deteriorating the measurement accuracy.

As described above, this specification discloses various aspects of technology, of which the main technologies are summarized below.

A device for measuring two-dimensional flicker according to one aspect is
a device for measuring two-dimensional flicker for two-dimensionally measuring flicker of a measurement target object, the device for measuring two-dimensional flicker including:
a plurality of two-dimensional sensors individually including a plurality of photoelectric conversion elements that are two-dimensionally arranged in a row direction and a column direction, and having a partial readout function of reading out only a pixel value of some of photoelectric conversion elements included in partial readout regions that have been set, among the plurality of photoelectric conversion elements;
a measurement region setting unit configured to two-dimensionally set a plurality of measurement regions on the measurement target object;
a sensor control unit configured to individually acquire each pixel in the plurality of measurement regions by setting each of the plurality of partial readout regions of the plurality of two-dimensional sensors in each of a plurality of partial imaging regions obtained by dividing an entire imaging region including entirely the measurement target object; and
a measurement processing unit configured to individually obtain a flicker value of the plurality of measurement regions, based on each pixel value in the plurality of measurement regions.

According to this aspect, each pixel value in each of the plurality of measurement regions is acquired, by setting each of the plurality of partial readout regions of the plurality of two-dimensional sensors in each of the plurality of partial imaging regions, and a flicker value of each of the plurality of measurement regions is obtained. Therefore, flicker values of all the measurement regions can be obtained. Whereas, only a pixel value of some of photoelectric conversion elements included in the set partial readout region are read out. Therefore, the plurality of two-dimensional sensors can be operated at high speed as compared with a case of reading out pixel values of all the photoelectric conversion elements. Therefore, it is possible to two-dimensionally measure flicker of the measurement target object without deteriorating the measurement accuracy.

In the aspect described above, for example,
each of the plurality of two-dimensional sensors may be configured to sequentially scan in the column direction to perform a collective readout operation of collectively reading out each pixel value of the plurality of photoelectric conversion elements arranged in the row direction, and
the sensor control unit may set the plurality of partial imaging regions by dividing the entire imaging region into pieces of a number of the two-dimensional sensors with a division boundary line being parallel to the row direction.

According to this aspect, the plurality of partial imaging regions are set by dividing the entire imaging region into pieces of the number of the two-dimensional sensors such that the division boundary line is parallel to the row direction. Therefore, by designating a row range for performing the collective readout operation in each of the plurality of two-dimensional sensors, it is possible to set each of the plurality of partial readout regions in each of the plurality of partial imaging regions.

In the aspect described above, for example,
the sensor control unit may set each of the plurality of partial readout regions of the plurality of two-dimensional sensors, based on a measurement distance to the measurement target object.

For example, when the measurement distance to the measurement target object changes, a relative positional relationship of each partial readout region with respect to each partial imaging region also changes. According to this aspect, since each of the plurality of partial readout regions of the plurality of two-dimensional sensors is set based on the measurement distance of the measurement target object, the relative positional relationship of each partial readout region with respect to each partial imaging region can be adjusted.

In the aspect described above, for example,
there may be further provided an optical system configured to individually form an image of light from the measurement target object toward the plurality of two-dimensional sensors, and
in a state where the measurement target object is arranged at a shortest shooting distance that is determined depending on a characteristic of the optical system, individual fields of view of the plurality of two-dimensional sensors with respect to the measurement target object may be overlapped at least partially with each other in the column direction.

According to this aspect, the individual fields of view of the plurality of two-dimensional sensors with respect to the measurement target object arranged at the shortest shooting distance are at least partially overlapped with each other in the column direction. Therefore, by setting each of the plurality of partial readout regions within an overlapping range, a relative positional relationship between each partial readout region and each partial imaging region can be adjusted. Note that, when the measurement target object is arranged farther than the shortest shooting distance, the overlapping range in the column direction of the individual fields of view of the plurality of two-dimensional sensors with respect to the measurement target object becomes large. Therefore, a range that can be adjusted by setting each of the plurality of partial readout regions increases.

In the aspect described above, for example,
individual fields of view of the plurality of two-dimensional sensors with respect to the measurement target object may be overlapped with each other in the column direction.

According to this aspect, the individual fields of view of the plurality of two-dimensional sensors with respect to the measurement target object are overlapped with each other in the column direction. Therefore, by setting each of the plurality of partial readout regions, a relative positional relationship between each partial readout region and each partial imaging region can be adjusted.

In the aspect described above, for example,
there may be further provided an optical component configured to branch light from the measurement target object toward the plurality of two-dimensional sensors.

According to this aspect, since light from the measurement target object is branched toward the plurality of two-dimensional sensors, the individual fields of view of the plurality of two-dimensional sensors with respect to the measurement target object are completely coincident. Therefore, there is an advantage that it is not necessary to adjust a relative positional relationship between each partial readout region and each partial imaging region.

In the aspect described above, for example, the measurement processing unit may individually obtain a flicker value of each of the measurement regions for each of the plurality of two-dimensional sensors, based on a pixel value of each of the measurement regions included in the partial imaging region, and may bind a flicker value of each of the measurement regions obtained for each of the plurality of two-dimensional sensors to obtain a flicker value of the plurality of measurement regions.

According to this aspect, first, a flicker value of the measurement region is obtained for each of the plurality of two-dimensional sensors, based on a pixel value of the measurement region included in the partial imaging region. Next, the flicker value of the measurement region obtained for each of the plurality of two-dimensional sensors is bound to obtain a flicker value of the plurality of measurement regions. Therefore, two-dimensional flicker of the measurement target object can be easily measured.

In the aspect described above, for example, when the measurement regions are set with adjacent measurement regions being overlapped with each other by the measurement region setting unit, the sensor control unit may set the partial imaging region to have adjacent partial imaging regions of the partial imaging regions to be overlapped with each other.

In order to obtain a measurement result with high S/N, the number of photoelectric conversion elements per measurement region may be increased to increase the obtained pixel value. In this case, increasing a size of the measurement region may cause adjacent measurement regions to be overlapped with each other. According to this aspect, in that case, the partial imaging regions are set such that adjacent partial imaging regions are overlapped with each other. Therefore, it is possible to suitably acquire each pixel value in the measurement regions that are overlapped with each other.

Although embodiments of the present invention have been illustrated and described in detail, these are merely illustrations and examples, and are not restrictive. The scope of the invention should be construed by the language of the appended claims.

The entire disclosure of Japanese Patent Application No. 2018-173419 filed on Sep. 18, 2018 is incorporated herein by reference in its entirety.

INDUSTRIAL APPLICABILITY

A device for measuring two-dimensional flicker of the present disclosure is used for a device for two-dimensionally measuring flicker generated on a display screen of a display device.

The invention claimed is:

1. A device for measuring two-dimensional flicker for two-dimensionally measuring flicker of a measurement target object, the device for measuring two-dimensional flicker comprising:
a plurality of two-dimensional sensors individually including a plurality of photoelectric conversion elements that are two-dimensionally arranged in a row direction and a column direction, the plurality of two-dimensional sensors having a partial readout function of reading out only a pixel value of some of photoelectric conversion elements included in partial readout regions that have been set, among the plurality of photoelectric conversion elements; and a hardware processor that:
two-dimensionally sets a plurality of measurement regions on the measurement target object;
individually acquires each pixel in the plurality of measurement regions, by setting each of the plurality of partial readout regions of the plurality of two-dimensional sensors, in each of a plurality of partial imaging regions obtained by dividing an entire imaging region corresponding to the measurement target object into the plurality of partial imaging regions; and
individually obtains a flicker value of the plurality of measurement regions, based on each pixel value in the plurality of measurement regions,
wherein:
each of the plurality of two-dimensional sensors sequentially scans in the column direction to perform a collective readout operation of collectively reading out each pixel value of the plurality of photoelectric conversion elements arranged in the row direction, and
the hardware processor sets the plurality of partial imaging regions by dividing the entire imaging region into pieces of a number of the two-dimensional sensors with a division boundary line being parallel to the row direction.

2. The device for measuring two-dimensional flicker according to claim 1, wherein
the hardware processor sets each of the plurality of partial readout regions of the plurality of two-dimensional sensors, based on a measurement distance to the measurement target object.

3. The device for measuring two-dimensional flicker according to claim 1, further comprising:
an optical system that individually forms an image of light from the measurement target object toward the plurality of two-dimensional sensors, wherein
in a state where the measurement target object is arranged at a shortest shooting distance that is determined depending on a characteristic of the optical system, individual fields of view of the plurality of two-dimensional sensors with respect to the measurement target object are overlapped at least partially with each other in the column direction.

4. The device for measuring two-dimensional flicker according to claim 1, wherein
individual fields of view of the plurality of two-dimensional sensors with respect to the measurement target object are overlapped with each other in the column direction.

5. The device for measuring two-dimensional flicker according to claim 1, further comprising:
an optical component that branches light from the measurement target object toward the plurality of two-dimensional sensors.

6. The device for measuring two-dimensional flicker according to claim 1, wherein
the hardware processor individually obtains a flicker value of each of the measurement regions for each of the plurality of two-dimensional sensors, based on a pixel value of each of the measurement regions included in each of the partial imaging regions, and binds a flicker value of each of the measurement regions obtained for each of the plurality of two-dimensional sensors, to obtain a flicker value of the plurality of measurement regions.

7. The device for measuring two-dimensional flicker according to claim 1, wherein
when the measurement regions are set with adjacent measurement regions being overlapped with each other by the hardware processor, the hardware processor sets the partial imaging regions to have adjacent partial imaging regions of the partial imaging regions to be overlapped with each other.

8. The device for measuring two-dimensional flicker according to claim 1, further comprising:
an optical component that branches light from the measurement target object toward the plurality of two-dimensional sensors.

9. The device for measuring two-dimensional flicker according to claim 1, wherein
the hardware processor individually obtains a flicker value of each of the measurement regions for each of the plurality of two-dimensional sensors, based on a pixel value of each of the measurement regions included in each of the partial imaging regions, and binds a flicker value of each of the measurement regions obtained for each of the plurality of two-dimensional sensors, to obtain a flicker value of the plurality of measurement regions.

10. The device for measuring two-dimensional flicker according to claim 1, wherein
when the measurement regions are set with adjacent measurement regions being overlapped with each other by the hardware processor, the hardware processor sets the partial imaging regions to have adjacent partial imaging regions of the partial imaging regions to be overlapped with each other.

11. The device for measuring two-dimensional flicker according to claim 2, further comprising:
an optical system that individually forms an image of light from the measurement target object toward the plurality of two-dimensional sensors, wherein
in a state where the measurement target object is arranged at a shortest shooting distance that is determined depending on a characteristic of the optical system, individual fields of view of the plurality of two-dimensional sensors with respect to the measurement target object are overlapped at least partially with each other in the column direction.

12. The device for measuring two-dimensional flicker according to claim 2, wherein
individual fields of view of the plurality of two-dimensional sensors with respect to the measurement target object are overlapped with each other in the column direction.

13. The device for measuring two-dimensional flicker according to claim 2, further comprising:
an optical component that branches light from the measurement target object toward the plurality of two-dimensional sensors.

14. The device for measuring two-dimensional flicker according to claim 2, wherein
the hardware processor individually obtains a flicker value of each of the measurement regions for each of the plurality of two-dimensional sensors, based on a pixel value of each of the measurement regions included in each of the partial imaging regions, and binds a flicker value of each of the measurement regions obtained for each of the plurality of two-dimensional sensors, to obtain a flicker value of the plurality of measurement regions.

15. The device for measuring two-dimensional flicker according to claim 2, wherein
when the measurement regions are set with adjacent measurement regions being overlapped with each other by the hardware processor, the hardware processor sets the partial imaging regions to have adjacent partial imaging regions of the partial imaging regions to be overlapped with each other.

16. The device for measuring two-dimensional flicker according to claim 3, wherein
individual fields of view of the plurality of two-dimensional sensors with respect to the measurement target object are overlapped with each other in the column direction.

17. The device for measuring two-dimensional flicker according to claim 3, further comprising:
an optical component that branches light from the measurement target object toward the plurality of two-dimensional sensors.

18. The device for measuring two-dimensional flicker according to claim 3, wherein
the hardware processor individually obtains a flicker value of each of the measurement regions for each of the plurality of two-dimensional sensors, based on a pixel value of each of the measurement regions included in each of the partial imaging regions, and binds a flicker value of each of the measurement regions obtained for each of the plurality of two-dimensional sensors, to obtain a flicker value of the plurality of measurement regions.

19. The device for measuring two-dimensional flicker according to claim 3, wherein
when the measurement regions are set with adjacent measurement regions being overlapped with each other by the hardware processor, the hardware processor sets the partial imaging regions to have adjacent partial imaging regions of the partial imaging regions to be overlapped with each other.

* * * * *